United States Patent [19]
Vladic

[11] Patent Number: 5,233,674
[45] Date of Patent: Aug. 3, 1993

[54] FIBER OPTIC CONNECTOR WITH SLIDING TAB RELEASE

[75] Inventor: Daniel P. Vladic, Antioch, Ill.

[73] Assignee: Methode Electronics, Inc., Chicago, Ill.

[21] Appl. No.: 796,539

[22] Filed: Nov. 21, 1991

[51] Int. Cl.⁵ .............................................. G02B 6/36
[52] U.S. Cl. ........................................ 385/56; 385/58; 385/88
[58] Field of Search ......................... 385/56, 58, 60, 88

[56] References Cited

U.S. PATENT DOCUMENTS

| | | | |
|---|---|---|---|
| 4,268,115 | 5/1981 | Slemon et al. | 385/88 |
| 4,380,349 | 4/1983 | Bray | 385/58 |
| 4,779,950 | 10/1988 | Williams | 385/58 |
| 4,872,736 | 10/1989 | Myers et al. | 385/60 |
| 5,073,042 | 12/1991 | Mulholland et al. | 385/69 |
| 5,082,344 | 1/1992 | Mulholland et al. | 385/60 |

*Primary Examiner*—Frank Gonzalez
*Attorney, Agent, or Firm*—Allegretti & Witcoff, Ltd.

[57] ABSTRACT

An improved connector assembly of the type having a receptacle for receiving a connector body in locking relation therewith, the receptacle having one or more flexible locking tab members which cooperate with corresponding steps or detent members formed on one or more sides of the connector body for positive locking of the connector in the receptacle, and a sliding release member which is carried on the connector body and is manually slidable toward the connector to move one or more tab release members so they engage and deflect the flexible locking tabs to release positions.

10 Claims, 4 Drawing Sheets

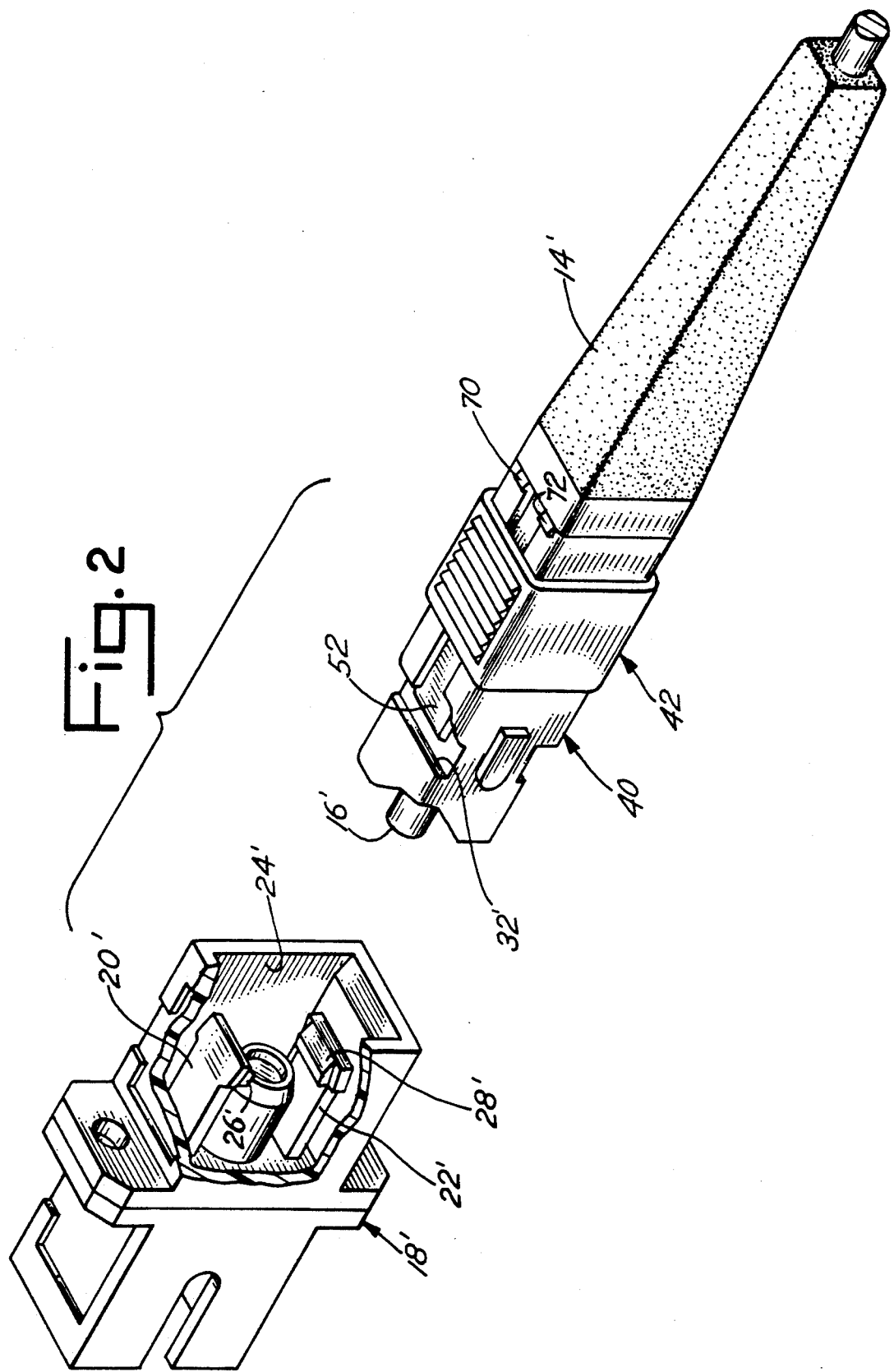

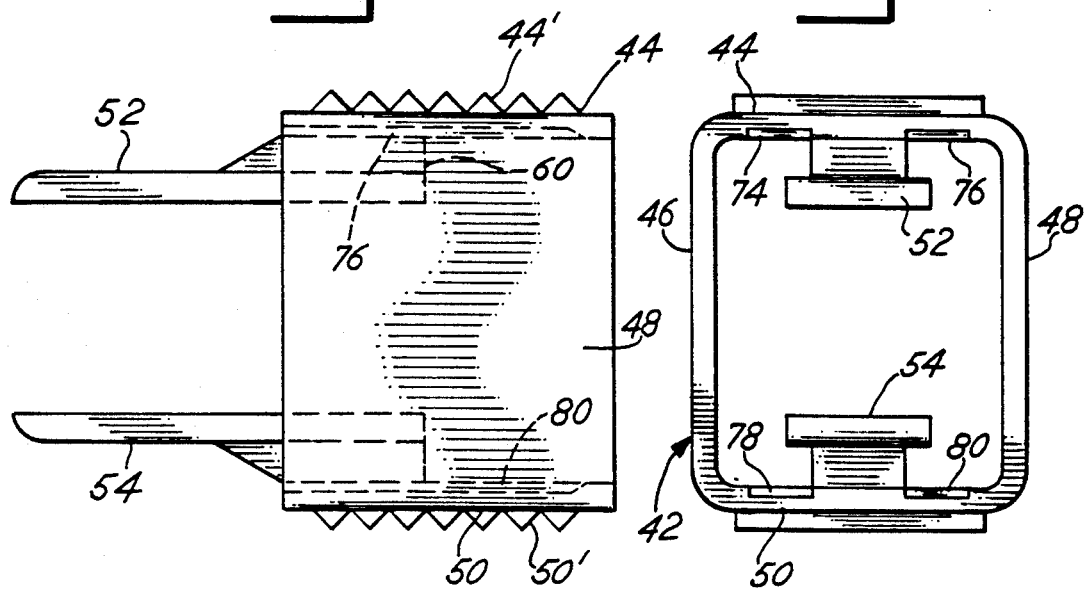
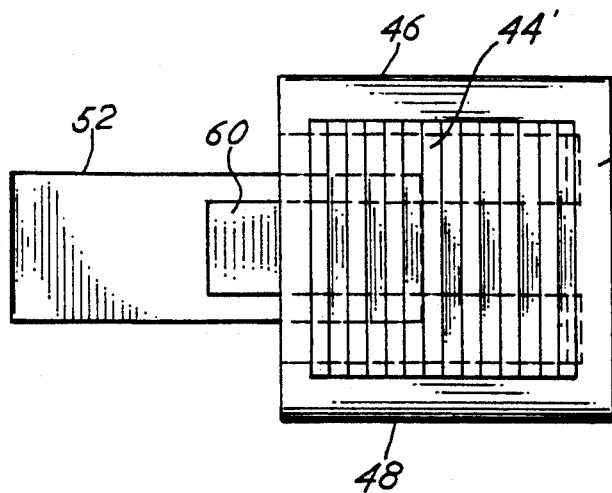

FIBER OPTIC CONNECTOR WITH SLIDING TAB RELEASE

BACKGROUND OF THE INVENTION

Field of the Invention

The present invention relates to a fiber optic connector of the type which customarily includes a female receptacle in combination with a pair of male connector bodies which are inserted into opposite ends of the female receptacle. Each connector body has a fiber optic cable terminated therein in known manner, and when the two connectors are inserted into opposite ends of the female receptacle, projecting fiber optic members from the respective cables are engaged. It is important that such engagement be secure and that the alignment of the two fiber optic members be precise so that an optical signal will pass without loss from one fiber optic cable to the other.

Such fiber optic connectors are known in the art. It is also known to provide means for locking the respective connector bodies in the female receptacle to retain them therein with the fiber optic ends in desired abutting contact. However, it is generally desired that such locking means be releasable so as to permit manual disengagement of the connector bodies and removal thereof from the receptacle member.

It is an object of the present invention to provide improved means for releasably locking a fiber optic connector in a female receptacle member.

More specifically, it is an object of this invention to provide improved means for effecting release of such locking means upon manual operation of release means, while at the same time avoiding accidental release of the locking means.

The foregoing and other objects and advantages of the invention will be apparent from the following description of a preferred embodiment thereof, taken in conjunction with the accompanying drawings.

DESCRIPTION OF THE DRAWINGS

FIG. 2 is a perspective view of a fiber optic connector assembly in accordance with the present invention having improved release means for manually disengaging the locking means which retains the connector body in the female receptacle;

FIG. 3 is an end view of a slide member which comprises the improved release means of the present invention;

FIG. 4 is a side elevational view of the slide of FIG. 3;

FIG. 5 is a top plan view of the slide of FIG. 3;

Now, in order to acquaint those skilled in the art with the manner of making and using my invention, I shall describe, in conjunction with the accompanying drawings, a preferred embodiment of my invention.

DETAILED DESCRIPTION OF THE INVENTION

Figure 1:
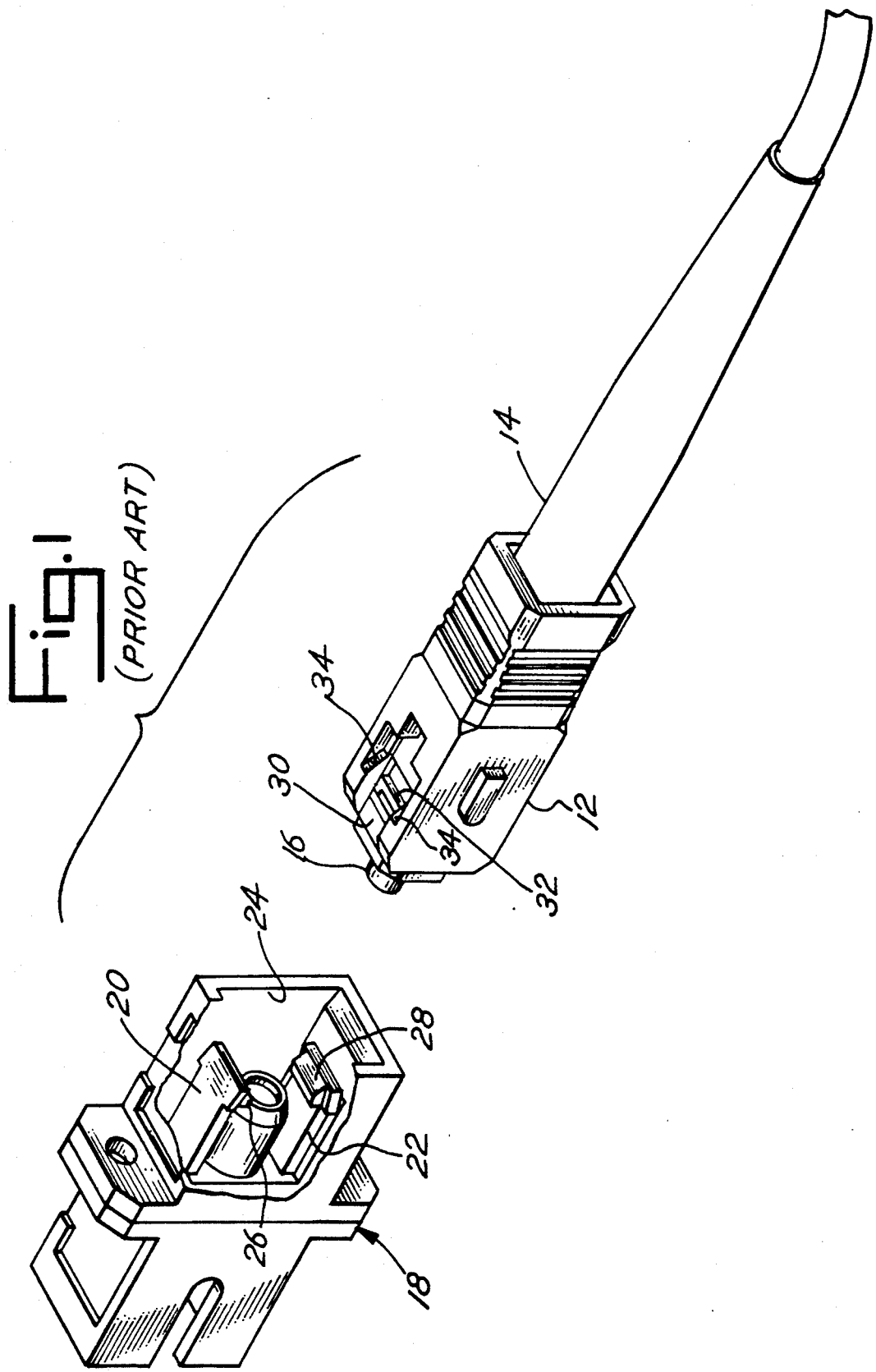
FIG. 1 is a perspective view of a prior art optical connector assembly comprising a receptacle member and a connector which terminates a fiber optic cable.

FIG. 1 shows a prior art optical connector made by Seiko Instruments, Inc. The known optical connector includes a connector body 12 which terminates an end of an optical cable 14. The far end of the optical cable is shown at 16, it being understood that the projecting cable end 16 has certain of the outer layers of the cable stripped away. As is known in the art, the projecting cable end 16 has a small diameter fiber optic member at the center thereof, and the purpose of the connector assembly is to abut the cable end 16 against a similar fiber optic cable end thereby to precisely align and abut the fiber optic members to permit an optical signal to pass from one fiber optic cable to the other.

There is shown in FIG. 1 a receptacle 18 which is broken away to illustrate the interior of one side of the receptacle which is designed to receive therein the end of the connector body 12. As is known in the art, a second connector body, which also terminates a fiber optic cable, may be inserted into the opposite side of the female receptacle 18 with the result that two projecting fiber optic cable ends as at 16 may be precisely aligned and abutted within the receptacle.

The present invention is concerned with the manner in which a connector body 12 is locked within a receptacle 18 and, more specifically, the manner of releasing the locking means to permit disengagement thereof and removal of the connector body 12 from the receptacle 18.

FIG. 1 illustrates a pair of locking tabs 20 and 22 which are generally parallel and project toward the open end 24 of the receptacle. Such locking tabs are flexible, and each has a locking projection at the end thereof as shown at 26 and 28. Referring to the connector body 12, a slot 30 is provided at the top of the connector body to permit the upper locking tab 20 to enter therein when the connector body is inserted into the open end 24 of the receptacle 18. The underside of the connector body 12 has structure identical to that shown on the top thereof for receiving the second locking tab 22.

The slot 30 terminates in a depression which creates a locking shoulder 32 which cooperates with the flexible locking tab 20 so when the connector body 12 is inserted fully into the open end 24 of the female receptacle, the locking projection 26 on the end of the locking tab 20 will engage and lock with the shoulder or detent 32. The opposite locking tab 22 will similarly lock with a detent on the bottom side of the connector body, thereby positively locking the connector body 12 in the receptacle 18.

The known connector body 12 shown in FIG. 1 further includes on the top side thereof a pair of unlocking ramps 34 which are positioned on opposite sides of the slot 30 and cooperate with the outer side edges of the locking tab 20. When the projection 26 on the locking tab 20 is locked behind the locking detent or step 32, one may manually pull the connector body 12 away from the receptacle 18 with the result that the outer side edges of the locking tab 20 will ride up the corresponding unlocking ramps 34 and thereby deflect the flexible locking tab 20 to a release position. A pair of unlocking ramps on the opposite side of the connector body 12 release the locking tab 22 in the same manner as described above.

A major problem with the foregoing known structure is that the connector body can be inadvertently unlocked and unmated from the receptacle 18 with only a small axial force. Moreover, such unlocking can occur accidentally due to shock, vibration or other induced forces.

Reference is now made to FIG. 2 which illustrates a connector assembly made in accordance with the present invention. Parts which are unchanged from the known connector assembly of FIG. 1 will be identified with corresponding primed reference numerals. The receptable 18' is identical to the known receptacle 18 of FIG. 1 and thus will not be further described.

The embodiment shown in FIG. 2 includes a connector body 40 which is surrounded by a slidable release member 42. As best shown in FIG. 3, the slidable release member 42 has a top wall 44, side walls 46 and 48, and a bottom wall 50. A plurality of V-shaped projections 44' and 50' on the top and bottom walls facilitate manual sliding of the release member 42 along the connector body.

FIGS. 3-5 illustrate a pair of locking tab release members 52 and 54 which comprise an integral part of the slidable release member 42. As viewed in FIG. 2, the upper release member 52 slides in a slot formed in the upper portion of the connector body 40, and it is positioned to cooperate with the projecting portion 26' on the locking tab 20' as shown in FIG. 2, as will be more fully described later herein.

Figure 6:
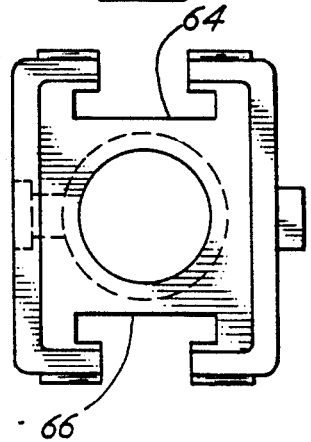
FIG. 6 is an end view of a connector body housing which cooperates with the slide of FIG. 3 which surrounds the housing as shown in FIG. 2.

FIGS. 3-5 illustrate the manner in which the upper tab release 52 is supported from the upper wall 44 by a connecting structure 60 which as viewed in FIG. 3 presents a T-shaped cross section. Accordingly, as shown in FIG. 6, the connector body 40 includes an upper T-shaped slot 64 to receive the tab release 52 and supporting structure 60, and a lower T-shaped slot 66 to receive the opposite tab release 54.

Figure 7:
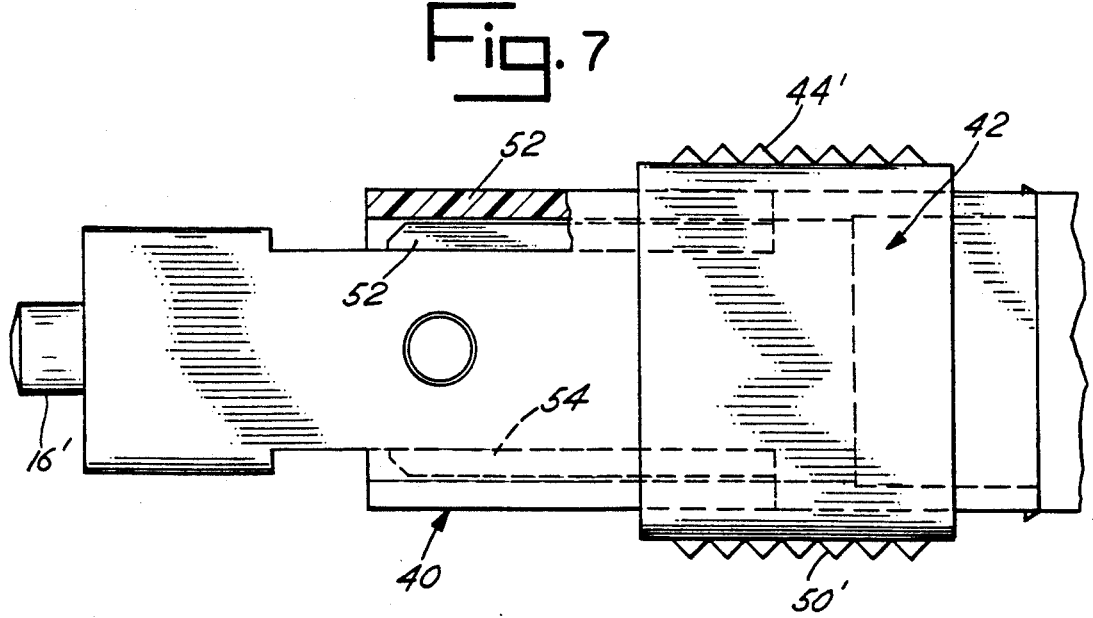
FIG. 7 is a fragmentary elevational view showing the slide of FIG. 3 mounted on the housing of FIG. 6, the view being partly in section to illustrate tab release means carried by the slide member.

FIG. 7 is a further view showing the slidable release 42 mounted on the outside of the connector body 40 with the pair of tab releases 52 and 54 extending axially to the left as there shown.

FIG. 2 further shows a pair of retaining tabs 70 and 72 projecting upwardly on the top of the connector body 40, and similar tabs are preferably formed on the bottom thereof. As shown in FIGS. 3 and 4, the underside of the upper wall 44 of the slidable release 42 is formed with a pair of internal longitudinal channels 74 and 76 and the top of the lower wall 50 is formed with a pair of similar internal channels 78 and 80. As best shown in FIG. 4, the four channels run almost the entire length of the slidable release 42, except they terminate short of the right-hand end thereof as viewed in FIG. 4.

Referring again to FIG. 2, the retaining tabs 70 and 72 are positioned to cooperate with the internal channels 74 and 76 (see FIG. 3). If the slidable release 42 is simply moved to the right as viewed in FIG. 2, the rear end of the slide can be forced over the retaining tabs 70 and 72, as well as over two similar tabs on the bottom of the connector body, in which case the tabs will be positioned inside respective ones of the four longitudinal channels 74, 76, 78 and 80 as shown in FIG. 3.

The operation of the improved locking release mechanism of the present invention will now be described with reference to FIG. 2. When it is desired to mate the connector body 40 with the receptable 18' in a locked position, the connector body is simply inserted into the open end 24' of the receptacle 18' until a locked position is reached where the projections 26' and 28' on the locking tabs 20' and 22' are engaged and locked behind corresponding locking detents 32' on the top and bottom of the connector body 40.

In the foregoing position, the connector body 40 will be positively locked inside the receptacle 18'. In order to maintain such a locking relationship, the slidable release 42 is preferably moved to the right as viewed in FIG. 2 until the rear end of the release is stopped by the retaining tabs 70 and 72. In the latter position, the slidable release 42 will be held in an inoperative position, and the connector body 40 will be maintained positively locked in the receptacle 18'. If an axial force is applied tending to pull the connector 40 out of the receptacle 18', the connector will remain positively locked in position. The foregoing is in complete contrast with the prior art connector assembly of FIG. 1 where such an axial force, whether deliberate or accidental, would effect disengagement due to the unlocking ramps 34.

When it is desired to disengage the connector body 40 from the receptacle 18', one need only manually force the slidable release 40 to the left as viewed in FIG. 2, to release it from the retaining tabs 70 and 72, and continue such sliding movement of the release 40 toward the receptacle until the outer ends of the tab release members 52 and 54 engage inside the corresponding locking tabs 20' and 22'. When the latter engagement occurs, the locking tabs will be cammed or deflected outwardly to release positions permitting the connector body 40 to be disengaged from the receptacle 18'.

The main advantage of the release mechanism of the present invention is that it permits positive locking which is not susceptible to accidental release, but at the same time it affords easy release by a simple sliding motion of the slidable release member 42.

What is claimed is:

1. An improved connector assembly of the type having a receptacle for receiving a connector body in locking relation therewith, the receptacle having at least one flexible locking tab means extending axially toward the connector body, the connector body having locking detent means for cooperation with the locking tab means whereby when the connector body is inserted into one end of the receptacle, a projection on the flexible locking tab means engages and locks with the detent means thereby effecting a positive lock which maintains said connector body in mating relation with the receptacle, the improvement comprising, in combination, manually operable sliding release means carried on said connector body, said sliding release means having at least one locking tab release means thereon extending axially toward said receptacle, said sliding release means being manually slidable toward said receptacle to a release position where said locking tab release means engages and deflects said flexible locking tab means to a release position and being manually slidable away from said receptacle to an inoperative position when it is desired to maintain said receptacle and connector body locked in mating relation.

2. An improved connector assembly as defined in claim 1 where said receptacle has a pair of said flexible locking tab means which cooperate with a pair of locking detent means formed on opposite sides of said connector body, and said sliding release means has a pair of locking tab release means for deflecting corresponding ones of said flexible locking tab means to release positions when said sliding release means is moved to its release position.

3. An improved connector assembly as defined in claim 1 where said locking tab means includes a projection which locks behind said locking detent means when said receptacle and connector are locked in mating position, and said locking tab release means engages inside the end of said locking tab means and deflects the latter outwardly to a release position when said sliding release means is moved to its release position.

4. An improved connector assembly as defined in claim 2 where each locking tab means includes an inward projection which locks behind a corresponding one of said detent means when said receptacle and connector are locked in mating relation, and each of said locking tab release means engages inside the end of a corresponding one of said locking tab means and deflects the latter outwardly to a release position when said sliding release means is moved to its release position.

5. An improved connector assembly as defined in claim 1 where said sliding release means includes a four-sided body which surrounds said connector body and is slidable thereon.

6. An improved connector assembly as defined in claim 5 where a pair of locking tab release means are carried on the inside of a pair of opposed walls of said four-sided body, each tab release means being spaced inwardly from a corresponding one of the opposed walls and being integrally connected therewith, said pair of tab release means being parallel to one another and spaced apart less than the distance between a pair of flexible locking tab means on said receptacle whereby each said locking tab release means engages inside the end of a corresponding locking tab means and deflects the latter outwardly to a release position when said four-sided body is moved to its release position.

7. An improved connector assembly as defined in claim 6 where each of said tab release means and its corresponding connection to one of said opposed walls defines a T-shaped cross-section, and said connector body is provided with a corresponding pair of generally T-shaped slots in which said tab release means are slidable.

8. An improved connector assembly as defined in claim 1 including retaining means on said connector body to releasably retain said sliding release means in its inoperative position when it is moved to the latter position.

9. An improved connector assembly of the type having a receptacle for receiving a connector body in locking relation therewith, the receptacle having a pair of opposed flexible locking tab means extending axially toward the connector body, the connector body having a pair of opposed locking detent means on opposite sides of said connector body for cooperation with corresponding ones of said locking tab means whereby when the connector body is inserted into one end of the receptacle, an inward projection on each flexible locking tab means engages and locks with a corresponding detent means thereby effecting a positive lock which maintains said connector body in mating relation with the receptacle, the improvement comprising, in combination, manually operable sliding release means carried on said connector body, said sliding release means including a slidable body portion and a pair of locking tab release means carried by said body portion, said pair of locking tab release means being parallel to one another and spaced apart less than the distance between said pair of opposed flexible locking tab means on said receptacle, said body portion of said sliding release means being manually slidable toward said receptacle to a release position whereby each locking tab release means engages inside the end of a corresponding locking tab means and deflects the latter outwardly to a release position.

10. An improved connector assembly as defined in claim 9 where said body portion of said sliding release means comprises a four-sided body which surrounds said connector body and is slidable thereon, and each said tab release means is spaced inwardly from a corresponding one of two opposed walls of said four-sided body and is integrally connected therewith, said connector body being provided with a pair of slots in which said tab release means are slidable.

* * * * *